(12) United States Patent
Akhtar et al.

(10) Patent No.: US 12,470,771 B1
(45) Date of Patent: Nov. 11, 2025

(54) ADAPTIVE VIDEO STREAMING ALGORITHM FOR OPTIMIZED MODEL PREDICTIVE CONTROL

(71) Applicant: Amazon Technologies, Inc., Seattle, WA (US)

(72) Inventors: Zahaib Akhtar, San Jose, CA (US); Satheesh Ramalingam, Sammamish, WA (US); Mohan Padmanabhan, Sammamish, WA (US); Yongjun Wu, Bellevue, WA (US); Tianyu Chen, Amherst, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/534,334

(22) Filed: Dec. 8, 2023

(51) Int. Cl.
- H04N 21/462 (2011.01)
- H04N 21/2187 (2011.01)
- H04N 21/44 (2011.01)
- H04N 21/4402 (2011.01)
- H04N 21/442 (2011.01)

(52) U.S. Cl.
CPC ..... *H04N 21/4621* (2013.01); *H04N 21/2187* (2013.01); *H04N 21/44008* (2013.01); *H04N 21/440263* (2013.01); *H04N 21/44209* (2013.01)

(58) Field of Classification Search
CPC .......... H04N 21/4621; H04N 21/2187; H04N 21/44008; H04N 21/440263; H04N 21/44209
See application file for complete search history.

(56) References Cited

U.S. PATENT DOCUMENTS

| | | | |
|---|---|---|---|
| 6,285,661 B1* | 9/2001 | Zhu | H04N 7/152 370/260 |
| 6,614,763 B1* | 9/2003 | Kikuchi | H04L 43/50 709/227 |
| 7,295,673 B2 | 11/2007 | Grab et al. | |
| 8,832,297 B2 | 9/2014 | Soroushian et al. | |
| 9,854,020 B1* | 12/2017 | Kum | H04L 65/752 |
| 10,225,588 B2 | 3/2019 | Kiefer et al. | |
| 11,050,808 B2 | 6/2021 | Osborne | |
| 11,102,553 B2 | 8/2021 | Chan et al. | |
| 12,003,564 B1* | 6/2024 | Waggoner | H04L 65/70 |
| 2013/0286879 A1* | 10/2013 | ElArabawy | H04W 28/0231 370/252 |
| 2014/0201324 A1* | 7/2014 | Zhang | H04L 65/613 709/217 |

(Continued)

FOREIGN PATENT DOCUMENTS

CA 2953422 C * 4/2021 ......... H04N 21/2343

OTHER PUBLICATIONS

Akhtar, Z., et al., "Oboe: Auto-tuning Video ABR Algorithms to Network Conditions," SIGCOMM, 2018, pp. 1-15.

(Continued)

*Primary Examiner* — James R Sheleheda
(74) *Attorney, Agent, or Firm* — Weaver Austin Villeneuve & Sampson LLP

(57) ABSTRACT

Adaptive bitrate techniques are used to select bitrates of segments to download when streaming video content. Different bitrate paths may be evaluated to optimize an objection function. Filtering bitrate paths that are unlikely to be optimal increases the computational speed, facilitating deployment.

20 Claims, 4 Drawing Sheets

(56) References Cited

U.S. PATENT DOCUMENTS

| | | | |
|---|---|---|---|
| 2015/0026358 A1* | 1/2015 | Zhang | H04N 21/44209 709/231 |
| 2016/0050246 A1* | 2/2016 | Liao | H04L 65/75 709/219 |
| 2016/0142510 A1* | 5/2016 | Westphal | H04L 67/02 709/219 |
| 2017/0026713 A1* | 1/2017 | Yin | H04N 21/643 |
| 2017/0310723 A1* | 10/2017 | Furtwangler | H04L 65/762 |
| 2018/0041788 A1* | 2/2018 | Wang | H04N 21/23805 |
| 2018/0302456 A1* | 10/2018 | Katsavounidis | H04L 65/61 |
| 2019/0158564 A1* | 5/2019 | Wang | H04N 21/23805 |
| 2019/0222491 A1* | 7/2019 | Tomkins | H04L 41/0823 |
| 2019/0334803 A1* | 10/2019 | Ickin | H04N 21/44209 |
| 2020/0036766 A1* | 1/2020 | Mahvash | H04N 21/23439 |
| 2020/0099733 A1* | 3/2020 | Chu | H04N 21/2402 |
| 2020/0236372 A1* | 7/2020 | Reznik | H04N 19/172 |
| 2020/0252663 A1* | 8/2020 | Giladi | H04N 21/435 |
| 2021/0037276 A1* | 2/2021 | Giladi | H04N 21/2187 |
| 2021/0288898 A1* | 9/2021 | Shen | H04L 43/0882 |
| 2023/0069178 A1* | 3/2023 | Sen | H04L 47/38 |
| 2024/0098247 A1* | 3/2024 | Menon | H04N 19/177 |
| 2024/0163511 A1* | 5/2024 | Lee | H04N 21/437 |

OTHER PUBLICATIONS

Lin, Y., "Decentralized Online Convex Optimization in Networked Systems," arXiv, 2022, pp. 1-43.

Lin, Y., et al., "Bounded-Regret MPC via Perturbation Analysis: Prediction Error, Constraints, and Nonlinearity," arXiv, 2022, pp. 1-32.

Lin, Y., et al., "Perturbation-based Regret Analysis of Predictive Control in Linear Time Varying Systems," arXiv, 2021, pp. 1-34.

Mao, H., et al., "Neural Adaptive Video Streaming with Pensieve," SIGCOMM, 2017, pp. 1-14.

Mao, H., et al., "Real-world Video Adaptation with Reinforcement Learning," arXiv, 2020, pp. 1-10.

Spiteri, K., et al., "BOLA: Near-Optimal Bitrate Adaptation for Online Videos," arXiv, 2020, pp. 1-15.

Yeo, H., et al., "Neural Adaptive Content-aware Internet Video Delivery," 13th USENIX Symposium on Operating Systems Design and Implementation, USENIX Association, 2018, pp. 645-661.

Yin, X., et al., "A Control-Theoretic Approach for Dynamic Adaptive Video Streaming over HTTP," SIGCOMM, 2015, 325-338.

* cited by examiner

ADAPTIVE VIDEO STREAMING ALGORITHM FOR OPTIMIZED MODEL PREDICTIVE CONTROL

BACKGROUND

The delivery of video content over the internet is facilitated by adaptive bit rate techniques that respond to network conditions and/or device capabilities to provide users with an optimized experience within currently available bandwidth. Selection of the bit rate for each segment can be a difficult problem. If the bit rate exceeds currently available bandwidth, buffering delays may occur. If the bit rate is too low, the visual quality of the video content may be unacceptably low for a period of time.

DETAILED DESCRIPTION

Figure 1:
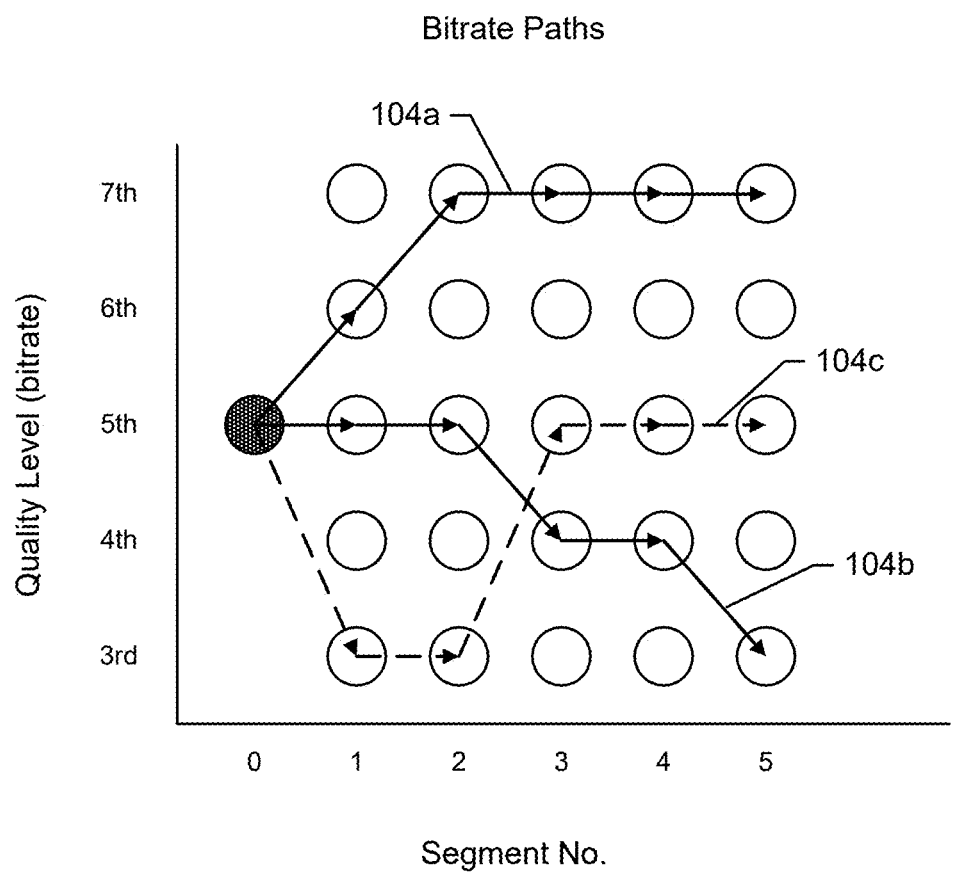
FIG. 1 presents an example of bitrate paths according to various embodiments herein.

This disclosure relates to enhancements for adaptive bitrate (ABR) techniques that relate to selection of a bitrate at which to request video fragments. Videos that start slowly, play at lower bitrates, and freeze frequently can cause viewers to abandon the videos or watch fewer minutes of the videos, decreasing the opportunity for generating revenue for the video providers. Higher bitrates correlate to a higher quality, which is desirable for users, but higher bitrates also increase the chance of buffering, which is undesirable. Balancing these concerns is important to maximize the quality of experience (QoE) for users, particularly in live events where rebuffering can increase the time between the live event occurring and playback of the live event for a user.

Media content, including video on demand (VOD), live event, and linear playout content, may be defined by a media presentation. A media presentation includes the video content and audio content as well as other content, such as closed captioning information. For VOD or linear playout content, the entire media content may be divided into segments from beginning to end having durations of, e.g., 2 seconds. For live events, the media content may be encoded in real time into segments having durations of e.g., 2 seconds, until the live event stream ends. Each segment is then encoded in a number of different bitrates to accommodate a range of device types and network connectivity. Encoding ladders allow delivery of a range of viewing experiences to users connecting with different devices over varying bandwidths, with "higher rungs" or "levels" generally corresponding to higher bandwidth consumption, higher resolutions, and/or higher visual qualities. A particular encoding ladder is configured to make tradeoffs between resources consumed during the encoding/decoding process (e.g., processing time, bandwidth, storage, etc.) and visual quality. An encoding ladder may have a corresponding bitrate ladder, which have "rungs" or "levels" corresponding to bitrates of fragments produced by the encoding ladder.

When a client device requests playback of a media presentation, a manifest file is provided to a media player that can use the information in the manifest file to request segments of media content. The manifest file includes information relating to the video content that allows a client device's media player to generate properly formatted requests for specific segments of the content. For a particular segment of a media presentation, the manifest file will typically identify a number (e.g., 8-15) of different options for fragments that may be requested for playback of that segment, which may be ordered by bitrate (i.e., ascending or descending bitrate levels). Bitrate level may be characterized by an ordinal number; a bitrate two levels higher than the fifth bitrate is the seventh bitrate, where bitrate $r_k$ is defined as $r_5 < r_6 < r_7$. The fragments for a given media presentation segment represent a variety of different bit rates and may be of different sizes, for different streaming protocols, for different display resolutions, etc.

A media player can download a video fragment for each segment at a bitrate that is appropriate for the available bandwidth of the network connection and buffer level, amongst other factors. Thus, a media player can switch to a segment with a lower bitrate when the available bandwidth is low to avoid rebuffering. If more bandwidth becomes available at a future time, the media player can switch back to a higher bitrate to provide a richer experience. The media player has a buffer that allows it to fetch and store fragments before they need to be rendered on the screen. Thus, the media player can tolerate brief network disruptions without interrupting the playback of the user by using the buffered fragments. A large disruption, however, will empty the buffer, resulting in rebuffering. The decision of which fragments to download at what bitrates is made by a bitrate adaptation algorithm within the media player, the design of such algorithms being the primary focus of this disclosure. Several implementations of ABR streaming exist, including Apple's HTTP Live Streaming (HLS), Microsoft's Live Smooth Streaming (Smooth), Sye streaming, Adobe's Adaptive Streaming (HDS), and MPEG-DASH (DASH).

Providing a high-quality experience for users requires balancing the quality of the video and rebuffering events. Video quality can be quantified by the bitrate at which the video is encoded. For instance, watching a movie in high definition (HD) encoded at 2 Mbps typically provides a better user experience than watching the same movie in standard definition (SD) encoded at a bitrate of 800 kbps. However, it is not always possible for users to watch videos at the highest encoded bitrate, since the bandwidth available on the network connection between the video player on the user's device and the video server constrains what bitrates can be watched. Streaming at a bitrate that is higher than the available network bandwidth will lead to video freezes in the middle of the playback, since the rate at which the video is being played exceeds the rate at which the video can be downloaded. Such video freezes are called rebuffers and playing the video continuously without rebuffers is a key factor in the QoE perceived by a user. Thus, balancing the contrasting requirements of playing videos at a high bitrate while at the same time avoiding rebuffers is central to providing a high-quality video watching experience.

Adaptive bitrate algorithms take current streaming conditions and available fragments as inputs and output a selected fragment to download. Current streaming conditions may include a buffer occupancy level and estimates of network throughput. Properties of available fragments to consider include duration and bitrate.

There are various classes of ABR algorithms. Rate-based algorithms may focus on the available bandwidth or throughput prediction to determine which fragment to download. Conversely, buffer-based algorithms may use the buffer level, e.g., how many seconds of content are available for playback in the buffer, to select the next fragment to download. Both of these algorithms may be implemented with a relatively low computational load during streaming, but they also may disregard useful information or lead to frequent bitrate switching, which can reduce the QoE for users.

Disclosed herein is a model predictive control (MPC) ABR algorithm for client-side fragment selection. MPC algorithms may generally be used to predict future behavior of a controlled system over a finite time horizon and compute an optimal control input that satisfies given system constraints and minimizes a cost function. Here, an MPC ABR algorithm may be used to maximize a QoE based on the bitrate utility, rebuffering cost, and bitrate switching cost:

$$QoE = \sum_{k=1}^{K} v(r_K)L - \beta \sum_{k=1}^{K} b(x_{K-1}, r_K, \omega) - \gamma \sum_{k=1}^{K} c(r_{K-1}, r_K) \quad \text{EQ. 1}$$

Where K is the lookahead window size, L is the fragment duration, $r_1, \ldots r_k$ are the bitrates to download for a segment k (while $r_o$ is the last chosen bitrate), xx is the buffer level after segment k has been downloaded (while $x_o$ is the current buffer level), ω is the estimated bandwidth during the window, v(·) represents a bitrate utility function, b(·, ·, ·) represents the rebuffering cost function, and c(·, ·) represents a switching cost function. Finally, β and γ are weights that may be tuned based on preferences or content types (e.g., live sports events vs concerts vs VOD).

Eq. 1 may operate over a window of segments, e.g., 2, 3, 4, 5, or more segments, to determine a utility, rebuffering cost, and bitrate switching cost for various bitrate paths, i.e., series of bitrates for segments in the window. In some implementations, the size of the window is about 2 to about 5 segments, at least about 2 segments, at least about 3 segments, or between about 2 and about 10 segments. FIG. 1 illustrates various bitrate paths 104a-c, where segment 0 is a prior segment that is currently being downloaded or already downloaded (at bitrate $r_o$), and segments 1-5 are segments to be downloaded. Each circle represents a different bitrate level for a particular segment, and arrows indicate a path between segments and the selected bitrate for a segment of a particular bitrate path. While quality levels are represented by ordinals 3rd-7th, it should be understood that additional quality levels may be available, and the quality level ordinal itself does not directly reflect the bitrate of the corresponding video fragment. Eq. 1 may evaluate each bitrate path to determine an optimal bitrate path, of which 3 bitrate paths are illustrated in FIG. 1 by lines between segment/bitrate nodes. After determining an optimal bitrate path, e.g., the bitrate path that maximizes QoE, one or more segments (e.g., segment 1) is downloaded at the bitrate corresponding to the optimal bitrate path. Additional segments may then either be downloaded according to the optimal bitrate path or Eq. 1 may be re-solved using segment 1 as the prior segment (i.e. segment 0), shifting the window forward one segment.

An MPC ABR algorithm has multiple advantages over other algorithms such as rate-based or buffer-based algorithms. In particular, an MPC algorithm can accurately model conditions over a short time horizon (e.g., tens of seconds of content) using both buffer occupancy and bandwidth prediction. As shown in Eq. 1, the utility of a bitrate may be explicitly balanced against the corresponding costs. Rate-based and buffer-based algorithms, by contrast, may subsume such costs within the analysis of throughput prediction or buffer levels, making it more difficult to model and such factors effect on QoE. Another advantage of an MPC ABR algorithm is having a cost function for bitrate switching. Frequent bitrate switching can reduce the QoE for users, who may prefer a consistent lower quality level than a frequently changing higher quality level. ABR algorithms that act only based on the buffer level or estimated bandwidth may frequently switch bitrates, which can be unpleasant for some users. By incorporating a specific bitrate switching cost function, the decrease in utility from bitrate switching may be accounted for against the increase in utility from a higher bitrate fragment.

One drawback of MPC algorithms, however, is the computational cost to deploy such algorithms. If an encoding ladder has 10 bitrates and the lookahead window is five fragments, then 105 bitrate paths are possible, which is prohibitively expensive to calculate for each segment during playback, especially on client devices having relatively limited resources for memory and computations, such as mobile devices. Various solutions can reduce the computational load of an MPC ABR algorithm, including previously computed look up tables or discretized buckets, but these implementations are not robust to parameters that may change between sessions or even between media presentations, such as bitrate ladders.

Disclosed herein are techniques to reduce the computational burden of an MPC ABR algorithm by not evaluating bitrate paths that are unlikely to maximize QoE. Techniques disclosed herein thus improve the efficiency of MPC ABR algorithms and reduce the runtime/cycle count to evaluate the objective function defined in Eq. 1. Bitrate paths may be filtered to eliminate or not evaluate bitrate paths that do not meet the following constraints.

In some implementations, the MPC ABR algorithm only evaluates monotonic bitrate paths. A monotonic bitrate path may be defined as a bitrate path where the order of bitrates is either entirely non-increasing or non-decreasing, e.g., $r_0 \le r_1 \le \ldots \le r_K$ or $r_0 \ge r_1 \ge \ldots \ge r_k$. FIG. 1 illustrates two monotonic bitrate paths 104a-b and one non-monotonic bitrate path 104c. For bitrate paths 104a, each subsequent segment has an equal or greater bitrate than the prior segment. Similarly, in bitrate path 104b each subsequent segment has a bitrate that is equal to or less than the prior segment bitrate. Bitrate path 104c, by contrast, has a decreasing bitrate from segment 0 to segment 1, and then an increasing bitrate from segment 2 to segment 3, and is thus not monotonic.

Evaluating only monotonic bitrate paths may reduce the number of bitrate paths, for 10 different possible bitrates in each path and a window of 5 segments, from 105 paths to about 6000 paths. In some implementations, the rationale for evaluating only monotonic bitrate paths is based on the relationship between the utility function, rebuffering cost function, and bitrate switching cost function; the bitrate path that optimizes QoE over a window is unlikely to contain a local maximum or minimum. For example, bitrate path 104c has a local minimum of bitrates at segments 1 and 2, as the bitrate decreases from segment 0 to segment 1, and then increases from segment 2 to segment 3. The increase in utility from increasing the bitrate between segments 2 and 3 would be likely offset by the bitrate switching cost. The offset shift between utility and bitrate switching, plus the increased value of the rebuffering cost function from a higher bitrate, would result in an overall equal or lower QoE than maintaining the current lower bitrate. A similar analysis may be made for a local maximum in the optimal bitrate path. Thus, these bitrate paths may be skipped without significantly decreasing the utility of the QoE score.

In some implementations, the MPC ABR algorithm may only evaluate bitrate paths within a range of bitrate levels of a bitrate level of a prior segment, e.g., $|r_K - r_0| \leq \Delta i_{max}$. For example, in FIG. 1, the quality level of segment 0 is 5th (which may correspond to any particular bitrate as output by an encoder), indicating it is the fifth bitrate in a bitrate ladder. Bitrate path 104b only changes the bitrate by two levels across the window, to the $3^{rd}$ bitrate for segment 5. Thus, the $\Delta i$ for bitrate path 104b is 2. In some embodiments, $\Delta i_{max}$ may be 2, 3, 4, 5, between 2 and 4, or at most 4. In some implementations, it is unlikely that the optimal bitrate path changes the bitrate level more than $\Delta i_{max}$ throughout the window. Thus, by ignoring bitrate paths having a bitrate switch of more than $\Delta i_{max}$ levels, the number of combinations of bitrate paths further decreases. For example, with constraints of a $\Delta i_{max}$ of 4 and a window of 5 segments, the number of bitrate paths having monotonic trajectories is 251, which is 3 orders of magnitude less than the 105 bitrate paths possible for 10 different quality levels across 5 segments.

In some implementations, $\Delta i_{max}$ may be between about 2 and about 8 bitrate levels, no more than 4 bitrate levels, no more than 5 bitrate levels, or between about 2 and about 4 bitrate levels. In some embodiments, the size of the window and $\Delta i_{max}$ are inversely correlated. E.g., if the size of the window is 5 segments, $\Delta i_{max}$ may be no more than 4 bitrate levels, while if the size of the window is 8 segments, $\Delta i_{max}$ may be no more than 2 bitrate levels. Similarly, if the size of the window is 3 segments, $\Delta i_{max}$ may be no more than 6 bitrate levels. The combinations described herein are not intended to be limiting, and various combinations of window length and $\Delta i_{max}$ may be used as described herein.

By combining the two constraints noted above, the number of bitrate paths to optimize over reduces by 3 orders of magnitude with a minimal probability of excluding an optimal bitrate path. This may thus reduce the computational burden of evaluating QoE for each bitrate path to enable use during streaming. The MPC ABR algorithm is thus improved by reducing the runtime of the algorithm and thus increasing the efficiency of a processor determining which fragment to request during streaming.

Figure 2:
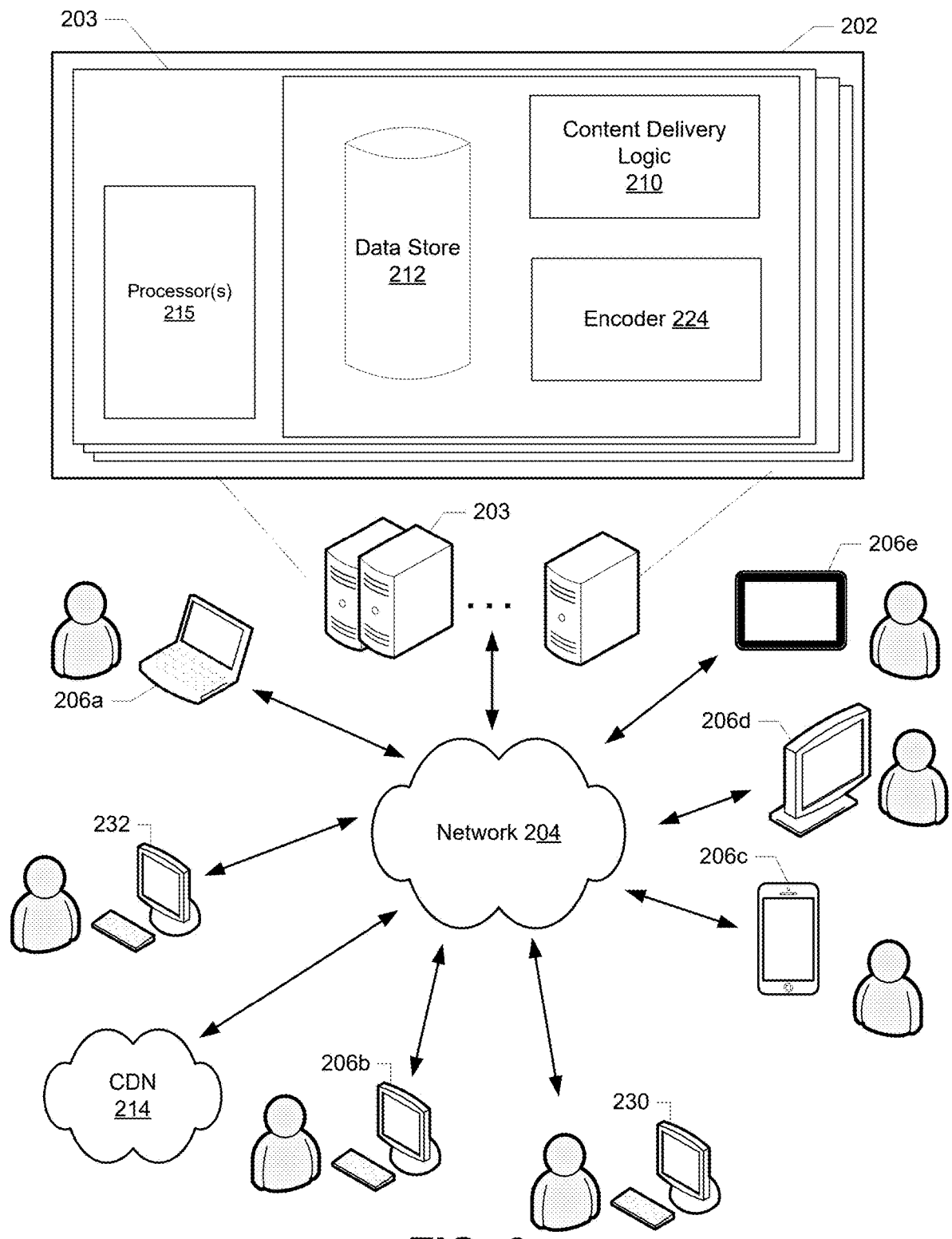
FIG. 2 illustrates a system architecture for delivery of live, linear playout, and VOD content.

FIG. 2 illustrates an example of a computing environment in which a video content service 202 provides streaming content for a live event, linear playout, and video-on-demand (VOD) content (e.g., video and/or audio) via network 204 to a variety of client devices (206-1 through 206-5) in accordance with the techniques described herein. In various implementations, the streaming content may be a video presentation of a live event (e.g., a livestream, broadcast, and/or camera feed of an ongoing live event and/or a recording of a partially or fully-completed event which may also be referred to as formerly-live event). In some implementations, the streaming content may be linear playout content, e.g., regularly scheduled content that may include VOD or live event content. In some implementations, the streaming content may be video on demand content. Content service 202 may conform to any of a wide variety of architectures such as, for example, a services platform deployed at one or more co-locations, each implemented with one or more servers 203. Servers 203 can include one or more processors 215, memory, and other hardware for performing the tasks disclosed herein. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc.

Client devices 206a-e may be any suitable device capable of connecting to network 204 for streaming on-demand and live streaming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches), etc.

Content service 202 may encode (using encoders 224) captured video of a live event for delivery as a plurality of live streams that include different quality-level and bitrate versions of the content. Encoder 224 encodes media content that it receives from content providers such as, for example, content service 202, a third party content provider, an advertisement exchange server, etc. Encoding parameters and/or profiles are used to encode and package fragments of media content at various bitrates. Content may be encoded using a variety of variable bitrate encoding techniques including single-pass encoding, multi-pass encoding, constrained variable bitrate encoding, content type variable bitrate encoding, and any other lossless and/or lossy encoding technique that meets an encoding standard (e.g., MPEG-2, H.264, HEVC/H.265, etc.). For example, client device 206a might receive fragments encoded at a bitrate of 3,200 kbps, and client device 206b might receive fragments encoded at a bitrate of 2,300 kbps. And depending on their network conditions might both begin to receive fragments at a bitrate of 3,200 kbps. After an encoding process, encoded fragments are stored in memory such as a local buffer for delivery to CDN 214 or to client devices 206a-e.

Content service 202 may deliver a plurality of live streams that include different quality-level and bitrate versions of the content according to a number of streaming protocols including, for example, HTTP Live Streaming (HLS), Dynamic Adaptive Streaming over HTTP (DASH), and Smooth Streaming. Live streaming clients (e.g., device 206a) consume the live content (delayed only a few seconds from the live action) using live manifests that are periodically made available by content service 202 as additional content is encoded and packaged. Fragments of content are then delivered over network 204.

In addition to providing access to media content, server 203 may also provide a variety of information related to the media content (e.g., various types of metadata and manifest data in data store 212 to which service 202 provides access). Alternatively, such information about the media content, as well as the media content itself may be provided and/or hosted by one or more separate platforms or databases, e.g., CDN 214. CDN 214 may help facilitate distribution of media content through a variety of software, hardware, and network components to client devices according to, for example, geographic proximity.

At least some of the examples described herein contemplate implementations based on computing models that enable ubiquitous, convenient, on-demand network access to a shared pool of computing resources (e.g., networks, servers, storage, applications, and services) to provide streaming content. As will be understood, such computing resources may be integrated with and/or under the control of the same entity, e.g., the entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular streaming protocols herein are merely by way of example. Suitable alternatives known to those of skill in the art may be employed.

In the following examples and for the sake of simplicity, content service 202 is described as if it is integrated with or includes the platform(s) that provides content to client devices. However, it will be understood that content service 202 may provide access to primary and/or secondary replacement content in conjunction with one or more content delivery networks (e.g., CDN 214) that may or may not be independent of content service 202. Implementations are contemplated in which content may be stitched and/or encoded, and/or metadata manipulated by a service that is integrated with a content service (e.g., 202), by a service associated with the content provider, or as a third-party service. The range of variations known to those of skill in the art are contemplated to be within the scope of this disclosure.

Implementations enabled by the present disclosure contemplate logic resident on the client devices consuming video content from content service 202; such logic is configured to request video fragments of media presentations having one of various available bitrates, such as live events, linear playout, or VOD content. Such logic might be part of an existing algorithm or module on the client device or implemented to work in conjunction with such an algorithm or module.

Content service 202 includes content delivery logic 210 that facilitates at least some aspects of content delivery to client devices 206. In some implementations, content delivery logic 210 facilitates providing segments of a live event, attributes associated with regions of frames of the segments, and secondary content as enabled by the present disclosure. In addition, content delivery logic 210 may include a personalization engine that selects one or more secondary content based, at least in part, on preferences of a user of a client device, characteristics of the user, characteristics of the client device, attributes of secondary content available in a repository of secondary content, and/or attributes of original segments of media content corresponding to regions for overlaying secondary content.

Content service 202 may also include a variety of information related to primary content and secondary content used to overlay on regions of the primary content. The information can include the primary and/or the secondary content, associated metadata, and manifests in data store 212 to which service 202 provides access. Alternatively, such information associated with and/or about the content, as well as the content itself may be provided and/or hosted by one or more separate platforms, e.g., CDN 214 or remote cloud storage. It should be noted that, while logic 210 and 224, and data store 212 are shown as integrated with content service 202, implementations are contemplated in which some or all of these operate remotely from the associated content service, and/or are under the control of an independent or more loosely integrated entity. From these examples, those of skill in the art will understand the diversity of use cases to which the techniques described herein are applicable.

Client devices 206*a-e* can also include various types of logic, for instance, decoder logic for decoding the encoded media content received from edge server 204*a* and playback handling logic to request playback of portions of media content. In addition, client devices 206*a-e* includes various types of memory to store and/or cache decoded media, one or more processors, and other hardware components to request and decode the encoded media content provided by server 203. For example, the processors of client devices 206*a-e* execute stored instructions in memory to implement decoding and content retrieval techniques to acquire and play back content provided in accordance with the techniques disclosed herein. In addition, client devices 206*a-e* may communicate with server 203 through different types of network protocols such as a stateful connection, e.g., a physical socket connection between server and client, or using a stateless connection, for instance, using the Hypertext Transfer Protocol (HTTP).

Figure 3:
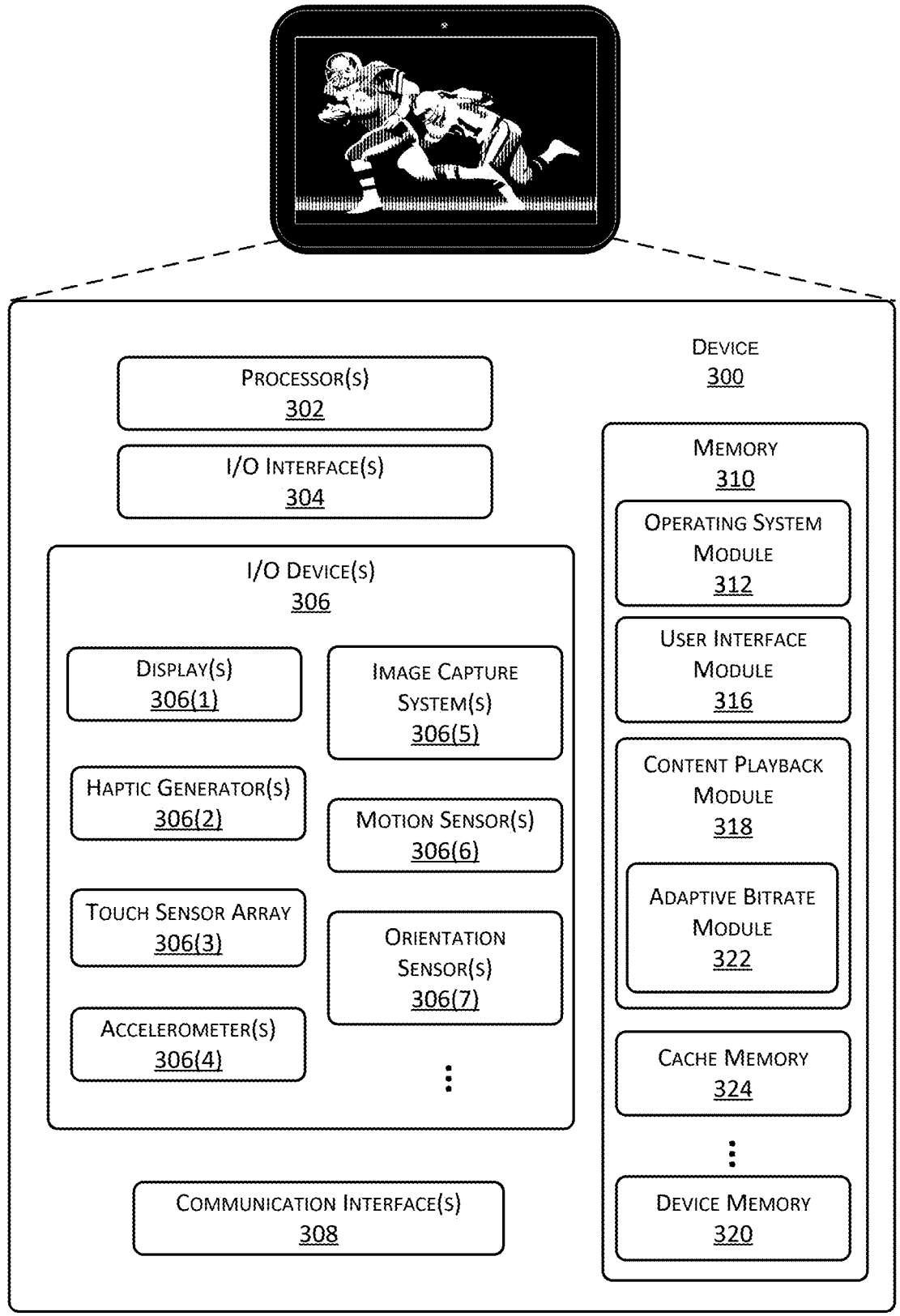
FIG. 3 illustrates a system architecture for a client device according to various implementations herein.

A block diagram of an example of a client device 300 suitable for use with various implementations is shown in FIG. 3. As mentioned above, it should be understood that device 300 may be any of a wide variety of device types. Device 300 (depicted as a tablet device) includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content playback module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The logic (represented by 322 in FIG. 3) used to select bitrates for segments as described herein may be implemented in a variety of ways, e.g., in hardware, software, and/or firmware. It will also be understood that device 300 of FIG. 3 is merely an example of a device with which various implementations enabled by the present disclosure may be practiced, and that a wide variety of other devices types may also be used (e.g., devices 206a-e). The scope of this disclosure should therefore not be limited by reference to device-specific details.

The client device 300 may be configured to request video fragments according to an adaptive bitrate algorithm as described herein. Adaptive bitrate module 322 may be configured to identify a plurality of bitrate paths and identify a bitrate path having a highest QoE score. The bitrate corresponding to that bitrate path may then be requested for download into the device memory 320, which may include a buffer for storing fragments until they are played back on, e.g., display 306(1).

Figure 4:
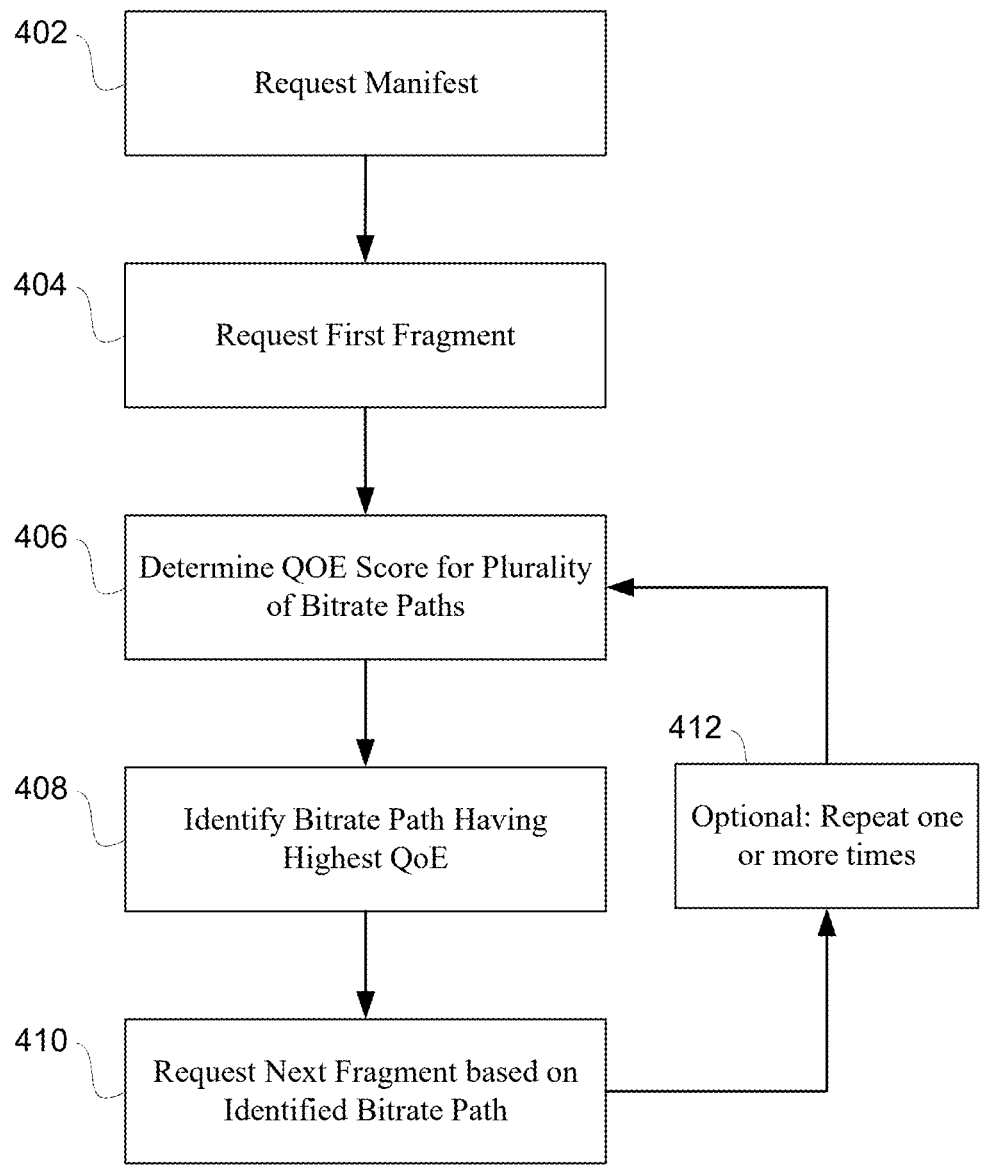
FIG. 4 presents a flowchart illustrating streaming media presentations to a client device.

FIG. 4 illustrates a particular implementation of requesting and delivering video content to a client device according to a various implementations. This and other examples described herein may be implemented with any of a variety of codecs including, for example, H.264, MPEG-1, MPEG-2, MPEG-4 Part 2, VC-1, H.263, VP8, VP9, Daala, and H.265 (also commonly referred to as HEVC). The techniques described herein may also be used with any of a variety of variable bit rate techniques. The example illustrated by FIG. 4 also assumes a media player on the client device that includes logic (e.g., module 322) configured to determine a bit rate with which to request a video fragment as described herein.

A client device transmits a request (e.g., generated by the device's media player) for a manifest file of a media presentation comprising information on video content and audio content associated with the media presentation (402). A media presentation, e.g., a live event, linear playout, or VOD content, may be defined by a media presentation description, also known as a manifest or playlist. As will be understood, the manifest file includes information relating to the video content that allows the client device's media player to generate properly formatted requests for specific fragments of the media presentation. For a particular segment of the media presentation, the manifest file will typically identify a number (e.g., 8-15) of different options for fragments that may be requested for playback of that segment. The fragments for a given content segment represent a variety of different bit rates and may be of different sizes, for different streaming protocols, for different display resolutions, etc.

For live streaming or linear playout content, the manifest may be a live manifest. Live event streaming may be distinguished from typical VOD streaming. Live event streaming provides a live manifest that contains references for content at the live head of the stream. These references may be treated as a sliding window, where updated manifest data is provided to add new references and remove old references. Old references, e.g., references to content that should have been played back at a prior time from the live head, may expire or be removed from the live manifest to reduce the live manifest file size and inhibit client devices from requesting previously streamed content. In some implementations, the size of the window may be based on the fragments available to download. In some implementations, the size of the window may be larger (e.g., extend farther) than the fragments available to download. In such embodiments, the bitrates of to be encoded fragments may be predicted or pre-determined (i.e., if a CBR encoding algorithm is used the bitrate may be known based on the configuration of an encoder)

When the media presentation is for VOD content, the media presentation may include information to request specific fragments for any duration of the content. VOD streaming, in contrast to live event streaming, may provide clients a manifest that allows clients to begin playback at various portions of VOD content. For example, trick modes, e.g., rewind and fast forward, may be enabled and allow viewers to select any portion of the VOD content for playback. As the manifest contains references to the entire VOD content, a user may select any portion of the VOD content for playback at any time rather than playback adhering to a predetermined schedule.

In some embodiments, a manifest may not be requested. The client device may receive information identifying a set of video fragments for each segment of a media presentation through other means. While a manifest is disclosed herein containing information for requesting video fragments, it should be understood that other techniques for communicating such information to a client device may be used.

In some embodiments, segments in the manifest file may have a constant duration, while in other embodiments segments may have a variable duration. For example, secondary content may be inserted at a specific time index that requires encoding a fragment having a shorter duration to facilitate the transition from primary content to the secondary content. In some implementations, each segment may have a constant duration.

In some implementations, the manifest file may include information identifying video fragments for each segment of the media presentation. The video fragments may be encoded at various bitrates as described above. In some implementations, a constant bitrate (CBR) scheme is used for encoding, where each rung on the encoding ladder is configured to encode content such that the bitrate of the content is constant at that rung for each segment. In some implementations, a variable bitrate encoding scheme is used, where the bitrate may vary within a range for each segment. This may facilitate fragments having a higher bitrate for, e.g., more complex frames having more motion across frames, and lower bitrate for e.g., less complex frames with less motion across frames. In embodiments using a constant bitrate encoding, an ABR algorithm disclosed herein may use the same bitrates for each rung in the bitrate ladder across all segments. In embodiments using a variable bitrate encoding, an ABR algorithm may use the bitrate of each video fragment as disclosed in the manifest or an average bitrate based on metadata included in the manifest.

The client device may then use the manifest to request fragments for download (404). The fragments may be downloaded at various bitrates. In some implementations, a first fragment is downloaded at an initial bitrate. The initial bitrate may be determined according to various parameters, such as a bandwidth estimate or a parameter defining a time within which the playback of the video content must begin. In some embodiments, the first fragment refers to the initial fragment requested by the client device. In other embodiments, the first fragment may be the most recently requested fragment or most recently downloaded fragment, which will change as playback of the media presentation proceeds.

After requesting fragments, e.g., an initial fragment to initiate playback, an ABR algorithm may be used to select subsequent fragments. An ABR algorithm may determine a QoE score for a plurality of bitrate paths (406). The QoE score may be determined using implementations of Eq. 1, above. In some implementations, the bitrate paths may be defined in a window of segments. The window may be a sliding window that includes the next segment to be downloaded. Returning to FIG. 1, if a previously downloaded fragment is segment 0, the next segment to be downloaded is segment 1. After segment 1 is requested, the window may slide forward such that segment 1 would be considered segment 0.

The size of the window may vary. In some embodiments, the window comprises two, three, four, or five segments. In some embodiments, the size of the window is about 2 to about 5 segments, at least about 2 segments, at least about 3 segments, or between about 2 and about 10 segments. In some embodiments, the segments in the window are sequential, i.e., represent a continuous sequence of content. In some embodiments, the window is 2 to 10 segments. Additional segments may improve the QoE prediction, but also increases the computational cost to determine the QoE for each bitrate path. Conversely, if the window is too large, then the additional segments may not provide additional marginal value over fewer segments. Additionally, some parameters used to determine the QoE, such as bandwidth estimation, may be less reliable when used to evaluating additional segments, as such segments would be downloaded in the future, e.g., more than 10 or more than 20 seconds in the future, when the bandwidth estimation is less reliable.

The bitrate paths for which a QoE score is determined may be based on the two filters noted above. In some implementations, only bitrate paths having monotonic bitrate trajectories are evaluated. In some implementations, only bitrate paths having bitrates within a predetermined number of levels of the prior downloaded or requested fragment are evaluated. Filtering the bitrate paths may reduce the computational complexity by two or three orders of magnitude, removing bitrate paths that are unlikely to be optimal and thus facilitating determination of a QoE score for the remaining bitrate paths within a duration available for selecting a fragment, e.g., between requests for fragments or the duration of a fragment.

Part of the QoE score determination may include using an estimate of available bandwidth. In some implementations, the bandwidth estimation is assumed to be constant over the window of segments. In some implementations, the bandwidth estimation may vary across segments, based on, e.g., trends of increasing or decreasing bandwidth. In some embodiments, the estimate of available bandwidth may be based on recently downloaded fragments. For example, download times might be determined for different segments of a media presentation or for successive segments requested during a streaming session with a bandwidth estimate being averaged and/or updated over the streaming session so that when video content is requested, the current estimate of available bandwidth can be used to determine the QoE score. As will be appreciated, these multiple data points might serve to provide a more reliable bandwidth estimate. Other methods of estimating bandwidth may be used and the techniques described herein are not limited to any single method of estimating bandwidth.

In some embodiments, the bandwidth estimation used for determining QoE scores may be weighted by a bandwidth error factor from (0, 1]. The bandwidth error factor may signify the accuracy of the bandwidth estimation; a large factor indicates a more accurate and thus reliable estimation. The bandwidth error factor may be determined based on various factors, such as the variability of network performance or devices known to have poor network performance. A lower bandwidth error factor will decrease the estimated bandwidth, leading to a higher rebuffering cost function in the QoE score; lower bandwidth increases the risk of rebuffering for higher bitrate segments.

In some implementations, the rebuffering cost function may be constrained that the buffer level should never go below 0, i.e., rebuffering does not occur. This constraint may be defined as:

$$x_k = \min\left(x_{k-1} - \frac{r_k L}{\omega} + L, x_{max}\right), x_{k-1} - \frac{r_k L}{\omega} \geq 0 \qquad \text{EQ. 2}$$

Where $\omega$ is the buffer estimation, optionally including the bandwidth error factor noted above. The buffer level after downloading a segment k at bitrate $r_k$ having duration L with bandwidth $\omega$ will be based on the prior buffer level, measured in seconds of content, minus the time to download the next segment. If Eq. 2. would resolve to be equal or less than zero, then a lower bitrate fragment would be selected to maintain the buffer level above zero.

Returning to the flowchart of FIG. 4, the client device's media player then identify a bitrate path having the highest QoE score (408), e.g., in accordance with an MPC ABR algorithm as described herein. The QoE score may be determined based on Eq. 1, above. A request is then sent for a fragment corresponding to the identified bitrate path (410). As an example, returning to FIG. 1, if bitrate path 104a has the highest QoE score, then segment 1 may be requested at the $6^{th}$ quality level/bitrate.

In some implementations, operations 406-410 may be repeated one or more times (412). During streaming operations 406-410 may be performed for each segment of a media presentation. In some implementations, operations 406-410 may be performed for less than each segment, e.g., every other segment. In some implementations the bitrate path identified in 408 may be used to request multiple fragments. For example, if bitrate path 104 has the QoE score, then segment 1 may be requested at the $6^{th}$ quality level and segment 2 may be requested at the $7^{th}$ quality level. In some embodiments, multiple segments may be simultaneously downloaded, e.g., 2, 3, or more segments. In such embodiments, a single bitrate path may be used to select the fragment to download for each segment. A new optimal bitrate path, based on a new QoE score, may then be determined for the next segment to be requested. It should be understood that the segment numbers of FIG. 1 are intended to define each segment in a window relative to a prior segment (segment 0), and do not describe an exact index of the segments within a media presentation.

In some implementations, the bitrate path having the highest QoE may be relatively similar over subsequent segments, e.g., each highest bitrate path may follow portions of bitrate path 104a (which may be extended as the sliding window advances segments). In other implementations, the optimal bitrate path may change, such that the actual progression of bitrates along a path of segments is not monotonic. This may result from varying network conditions that can affect the estimated bandwidth and the buffer level. While an MPC ABR algorithm described herein may have fewer bitrate switches than other algorithms, e.g., a buffer-based algorithm, the requested bitrates may still fluctuate throughout a session as the objective function described in Eq. 1, above, determines a monotonically increasing or monotonically decreasing bitrate path is optimal.

CONCLUSION

Although the foregoing embodiments have been described in some detail for purposes of clarity of understanding, it will be apparent that certain changes and modifications may be practiced within the scope of the appended claims. Embodiments disclosed herein may be practiced without some or all of these specific details. In other instances, well-known process operations have not been described in detail to not unnecessarily obscure the disclosed embodiments. Further, while the disclosed embodiments will be described in conjunction with specific embodiments, it will be understood that the specific embodiments are not intended to limit the disclosed embodiments. It should be noted that there are many alternative ways of implementing the processes, systems, and apparatus of the present embodiments. Accordingly, the present embodiments are to be considered as illustrative and not restrictive, and the embodiments are not to be limited to the details given herein.

What is claimed is:

1. A method, comprising:
   requesting a manifest file corresponding to a media presentation of a live event;
   receiving the manifest file, wherein the manifest file comprises information identifying a set of video fragments for each segment of the media presentation, each set of the video fragments comprising different bitrate versions of the corresponding segment of the media presentation;
   requesting a first video fragment for a first segment of the media presentation at a first bitrate;
   receiving the first video fragment in a buffer;
   determining a plurality of bitrate paths in a window of sequential segments of the media presentation starting with the first segment, wherein each bitrate path of the plurality of bitrate paths is a monotonic trajectory of bitrates for segments in the window;
   determining a quality of experience (QoE) score for each bitrate path of the plurality of bitrate paths, wherein the QoE score for a bitrate path is determined from:
      a utility of the bitrate path based on the bitrates for each segment in the bitrate path,
      a rebuffering cost of the bitrate path based on a buffer level of the buffer after downloading segments in the bitrate path and the bitrate of segments in the bitrate path, and
      a bitrate switching cost based on the bitrates of sequential segments in the bitrate path;
   identifying the bitrate path of the plurality of bitrate paths having the highest QoE; and
   requesting a second video fragment at a second bitrate along the identified bitrate path for a second segment of the media presentation sequential to the first segment.

2. The method of claim 1, wherein the window comprises two to ten segments.

3. The method of claim 1, wherein each QoE score is additionally based on an estimated bandwidth available to download video fragments and a predetermined bandwidth error factor.

4. The method of claim 1, wherein each bitrate in the plurality of bitrate paths is within a predetermined number of bitrate levels of the bitrate level of the first video fragment.

5. A method, comprising:
   receiving information identifying a set of video fragments for each segment of a media presentation, each set of the video fragments comprising different bitrate versions of the corresponding segment of the media presentation;
   requesting video fragments corresponding to segments of the media presentation using an adaptive bitrate technique, wherein the adaptive bitrate technique comprises:
      determining, for a segment, a quality of experience (QoE) score for each bitrate path of a plurality of bitrate paths in a window of segments, the window comprising the segment, wherein each bitrate path of the plurality of bitrate paths is a monotonic trajectory of bitrates for segments in the window,
      identifying a first bitrate path of the plurality of bitrate paths as having the highest QoE,
      identifying a first bitrate for the segment corresponding to the first bitrate path, and
      selecting a video fragment corresponding to the segment based on the first bitrate.

6. The method of claim 5, wherein the information identifying the set of video fragments is part of a manifest.

7. The method of claim 5, wherein the video fragments represent a live event, linear playout, or video on demand (VOD).

8. The method of claim 5, wherein the size of the window is two to ten segments.

9. The method of claim 5, wherein each bitrate in the plurality of bitrate paths is within a predetermined number of bitrate levels of the bitrate level of a prior video fragment prior to the segment.

10. The method of claim 9, wherein the predetermined number is two to eight bitrate levels.

11. The method of claim 5, further comprising determining a QoE score for the first bitrate path based on:
   a utility of the first bitrate path based on the bitrates for each segment in the first bitrate path,
   a rebuffering cost of the first bitrate path based on a buffer level of the buffer after downloading segments in the first bitrate path and the bitrate of segments in the first bitrate path, and
   a bitrate switching cost based on the bitrates of sequential segments in the first bitrate path.

12. The method of claim 11, wherein the QoE score is based in part on an estimated bandwidth available to download video fragments and a predetermined bandwidth error factor.

13. A system, comprising one or more processors and one or more memories configured for:

receiving information identifying a set of video fragments for each segment of a media presentation, each set of the video fragments comprising different bitrate versions of the corresponding segment of the media presentation;

determining a plurality of bitrate paths in a window of segments, the window comprising segments of the media presentation including a first segment, wherein each bitrate path of the plurality of bitrate paths is a monotonic trajectory of bitrates for segments in the window, determining a quality of experience (QoE) score for each bitrate path, identifying a first bitrate path of the plurality of bitrate paths as having the highest QoE, and requesting a first video fragment of the media presentation at a first bitrate, the first video fragment corresponding to the first segment, wherein the first bitrate corresponds to the bitrate of the first segment in the first bitrate path.

14. The system of claim 13, wherein the information identifying the set of video fragments is part of a manifest.

15. The system of claim 13, wherein the video fragments represent a live event, linear playout, or video on demand (VOD).

16. The system of claim 13, wherein the size of the window is two to ten segments.

17. The system of claim 13, wherein each bitrate in the plurality of bitrate paths is within a predetermined number of bitrate levels of the bitrate level of the video fragment prior to the segment.

18. The system of claim 17, wherein the predetermined number is two to eight bitrate levels.

19. The system of claim 13, further comprising determining a QoE score for the first bitrate path based on:

a utility of the first bitrate path based on the bitrates for each segment in the first bitrate path, a rebuffering cost of the first bitrate path based on a buffer level of the buffer after downloading segments in the first bitrate path and the bitrate of segments in the first bitrate path, and a bitrate switching cost based on the bitrates of sequential segments in the first bitrate path.

20. The system of claim 19, wherein the QoE score is based in part on a predicted bandwidth available to download video fragments and a predetermined bandwidth error factor.

* * * * *